(12) United States Patent
Liu

(10) Patent No.: US 6,189,429 B1
(45) Date of Patent: Feb. 20, 2001

(54) WORKPIECE SUPPORTING ASSEMBLY FOR A TABLE SAW

(75) Inventor: Ta-Chang Liu, Taichung (TW)

(73) Assignee: P&F Brother Industrial Corporation (TW)

(*) Notice: Under 35 U.S.C. 154(b), the term of this patent shall be extended for 0 days.

(21) Appl. No.: 09/409,062

(22) Filed: Sep. 30, 1999

(51) Int. Cl.[7] .............................. B23D 19/00; B23D 33/02
(52) U.S. Cl. ................... 83/477; 83/435.14; 108/143; 144/286.5; 144/287
(58) Field of Search ......................... 83/432, 435.14, 83/438, 477, 477.2; 108/90, 143; 144/286.1, 286.5, 287, 1.1; 269/289 R, 290, 291, 292, 296

(56) References Cited

U.S. PATENT DOCUMENTS

| | | | | |
|---|---|---|---|---|
| 2,937,765 | * | 5/1960 | Swanic | 108/143 |
| 4,161,974 | * | 7/1979 | Patterson | 144/287 |
| 4,601,226 | * | 7/1986 | McClintock | 83/477 X |
| 5,201,863 | * | 4/1993 | Peot | 83/477 |
| 5,379,816 | * | 1/1995 | Charlton | 144/287 |
| 5,979,523 | * | 11/1999 | Puzio et al. | 144/287 |

* cited by examiner

Primary Examiner—W. Donald Bray
(74) Attorney, Agent, or Firm—Smith, Gambrell & Russell, LLP

(57) ABSTRACT

A workpiece supporting assembly for a table saw includes a worktable and two horizontal rows of rollers disposed respectively and rotatably on two vertical side walls of the worktable. Two movable rails are disposed respectively on the side walls of the worktable. Each of the rails has an open-ended horizontal dovetail groove that extends long the length thereof and that confines the rollers of a corresponding one of the rows therein. A horizontal extension support plate rides on the rails. Accordingly, the rails and the extension support plate can move smoothly relative to the worktable.

4 Claims, 6 Drawing Sheets

WORKPIECE SUPPORTING ASSEMBLY FOR A TABLE SAW

BACKGROUND OF THE INVENTION

1. Field of the Invention

This invention relates to a table saw, more particularly to a workpiece supporting assembly for a table saw, which has two rows of rollers that guide two rails to move smoothly relative to a worktable.

2. Description of the Related Art

Referring to FIG. 1, a conventional table saw is shown to include a base 1, a worktable 10 that is fixed on the base 1, and two movable rails 11, 12 that are disposed respectively on two opposite vertical side walls of the worktable 10. A saw member 2 extends upward from the worktable 10. A horizontal workpiece positioning strip 3 rides on the rails 11, 12 for abutment of a workpiece to be cut. A horizontal extension support plate 4 rides on the right end portions of the rails 11, 12, and can move with the latter to abut against the right edge of the worktable 10. The worktable 10 and the extension support plate 4 constitute a workpiece supporting assembly for supporting the workpiece thereon.

Referring to FIG. 2, each of the vertical side walls of the worktable 10 is formed integrally with a horizontal row of positioning members 13 (only one is shown). Each of the positioning members 13 has a threaded hole 131, within which a locking member 14 is provided. Each of the locking members 14 includes an externally threaded rod 140 extending through the threaded hole 131 in the corresponding positioning member 13, a rectangular plate 141 fixed to one end of the threaded rod 140, and a lock nut 142 sleeved on the other end of the threaded rod 140. As illustrated, the plate 141 is received slidably within an open-ended horizontal dovetail groove 111 in the rail 11. In a situation where the nut 142 is loosened, the rail 11 can move on the plate 141. When the nut 142 is tightened, the rail 11 is locked on the worktable 10. The rail 12 (see FIG. 1) has a structure that is the same as that of the rail 11, and is locked on the worktable 10 in the same manner as the rail 11. Because the plates 142 are rectangular, it is difficult to move the rails 12 (see FIG. 1) smoothly on the plates 142.

SUMMARY OF THE INVENTION

The object of this invention is to provide a table saw with an improved workpiece supporting assembly, which has rollers for guiding two rails to move smoothly relative to a worktable.

According to this invention, a workpiece supporting assembly for a table saw includes a worktable and two horizontal rows of rollers disposed respectively and rotatably on two vertical side walls of the worktable. Two movable rails are disposed respectively on the side walls of the worktable. Each of the rails has an open-ended horizontal dovetail groove that extends along the length thereof and that confines the rollers of a corresponding one of the rows therein. A horizontal extension support plate rides on the rails. Accordingly, the rails and the extension support plate can move smoothly relative to the worktable.

Preferably, the worktable is provided with two fixed stop elements. Each of the rails is provided with a fixed element that is limited to move between the stop elements, thereby retaining the rails on the worktable.

BRIEF DESCRIPTION OF THE DRAWINGS

These and other features and advantages of the invention will become apparent in the following detailed description of a preferred embodiment, with reference to the accompanying drawings, in which.

DETAILED DESCRIPTION OF THE PREFERRED EMBODIMENT

Figure 3:
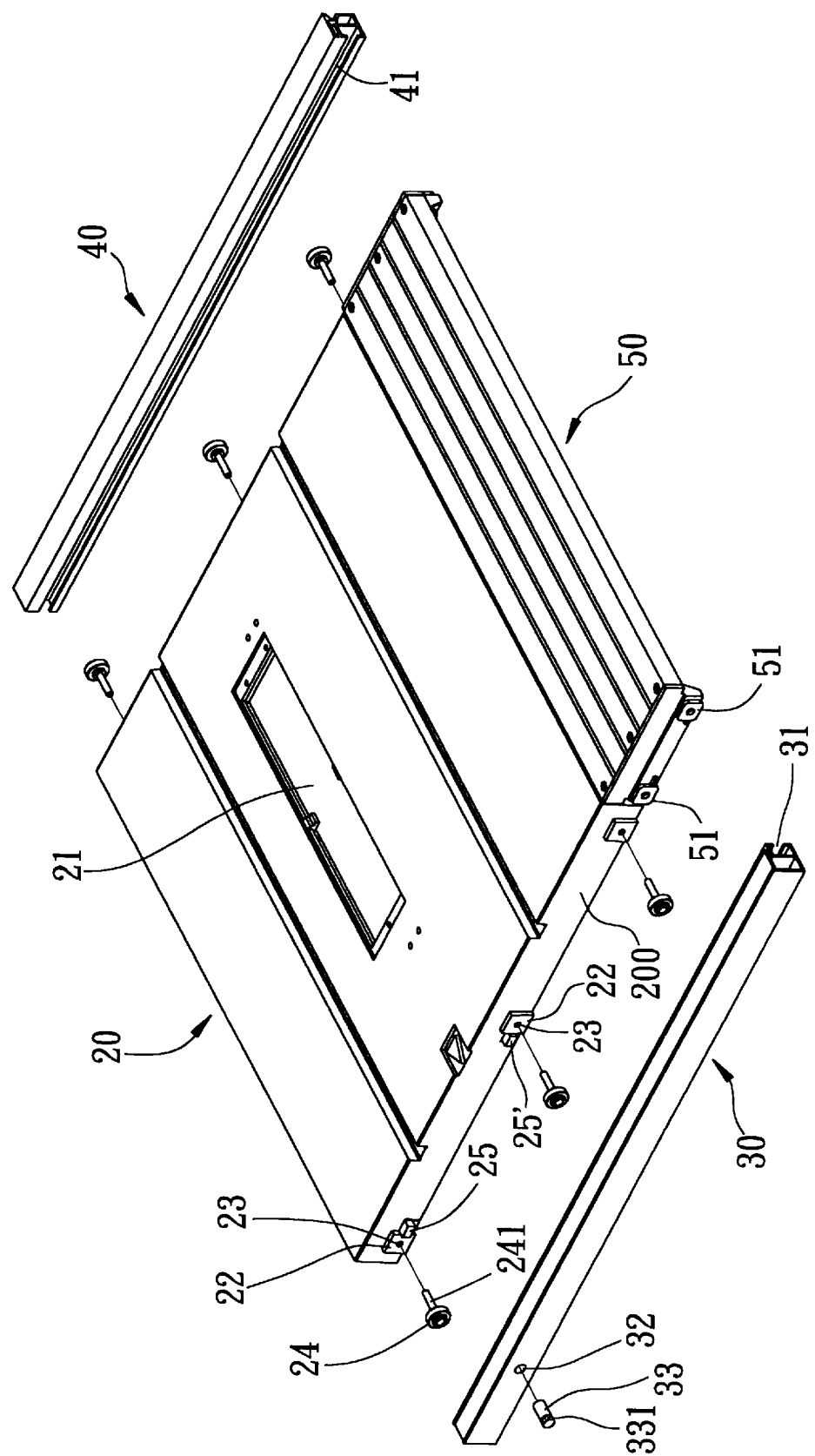
FIG. 3 is a partly exploded perspective view of the preferred embodiment of a workpiece supporting assembly for a table saw according to this invention.
Figure 4:
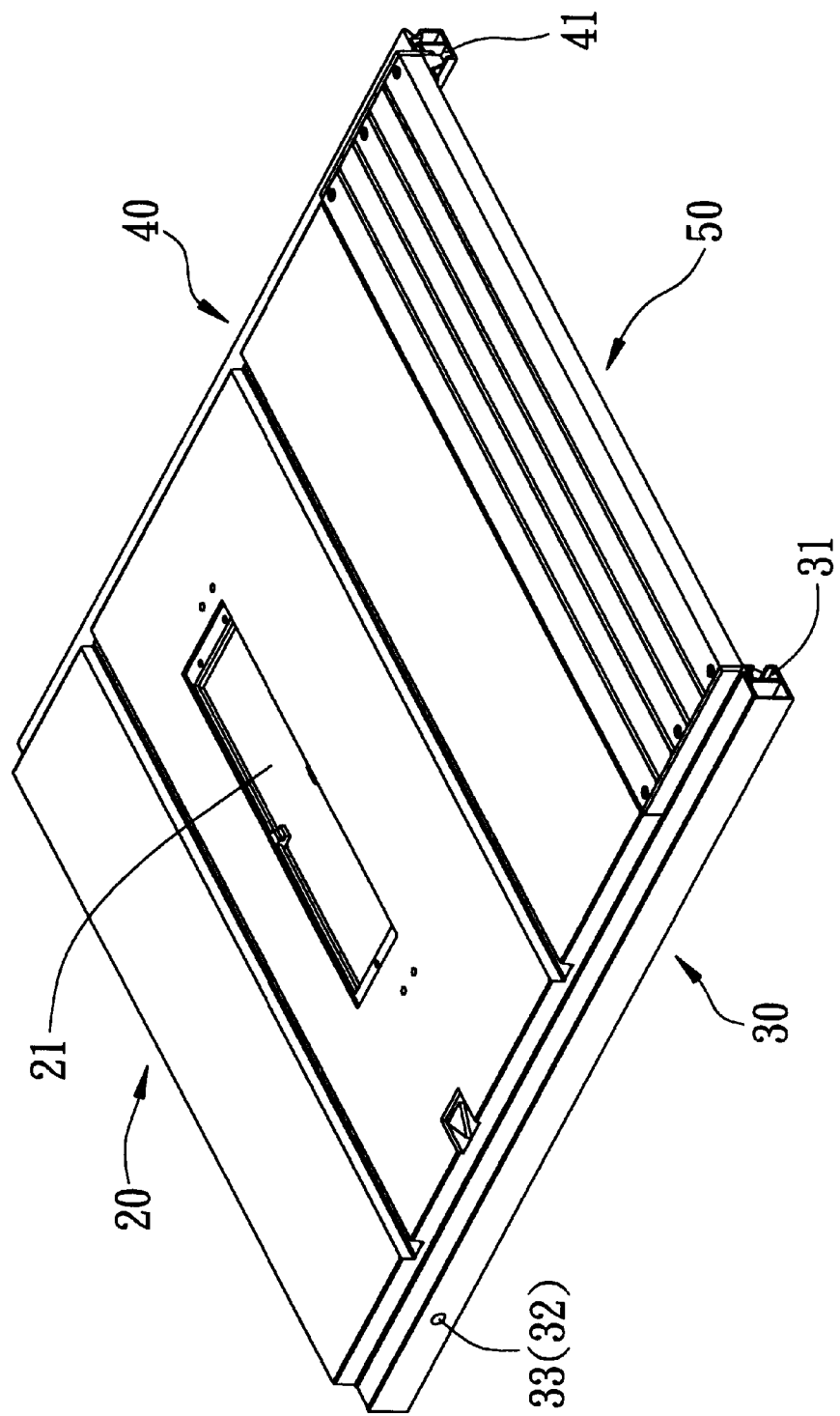
FIG. 4 is an assembled perspective view of the preferred embodiment.
Figure 5:
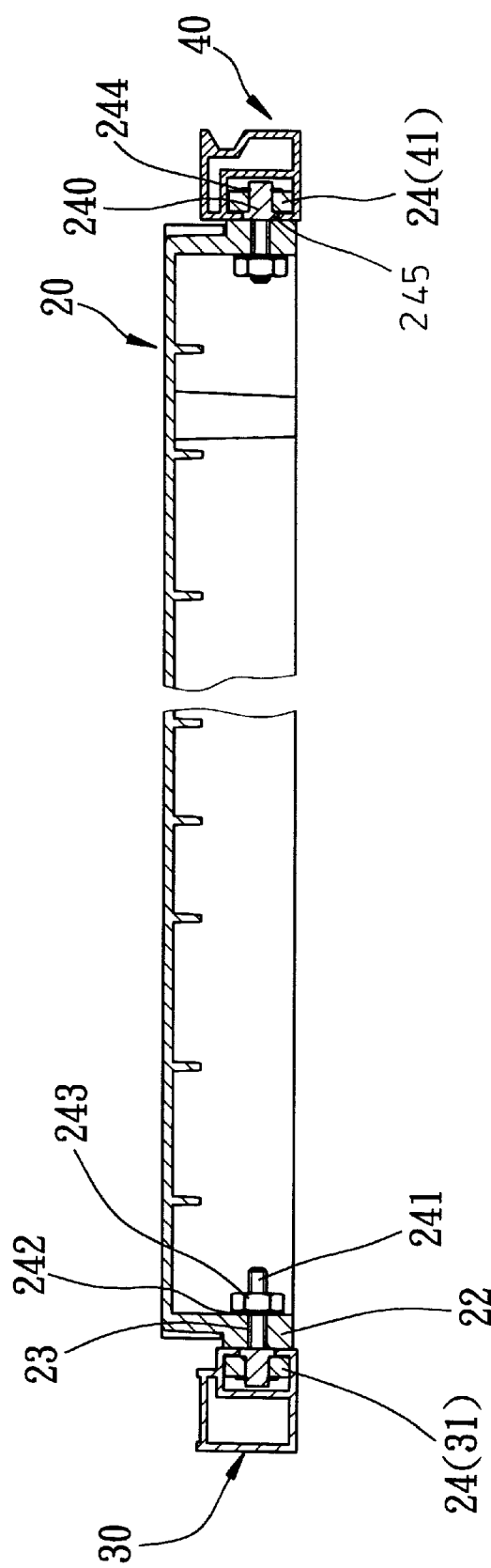
FIG. 5 is a sectional front view of the preferred embodiment.

Referring to FIGS. 3, 4 and 5, the preferred embodiment of a workpiece supporting assembly for a table saw according to this invention is shown to include a worktable 20, two movable rails 30, 40, and a horizontal extension support plate 50. The top surfaces of the worktable 20 and the extension support plate 50 are flush with each other.

The worktable 20 includes a rectangular hole 21 for extension of a saw (not shown) therethrough, and two opposite vertical side walls 200 that are provided respectively with two horizontal rows of bearings 22. Each of the bearings 22 has a circular hole 23, through which a horizontal rotating shaft 241 of a roller 24 extends. An adjacent pair of the bearings 22 are provided respectively with two fixed stop elements 25, 25'.

Each of the rails 30, 40 has an open-ended horizontal dovetail groove 31, 41 that extends along the length thereof, and confines a row of rollers 24 therein. The rail 30 is formed with a pin hole 32, within which a knurled portion 331 of a fixed element or pin 33 is press fitted. The pin 33 is positioned relative to the worktable 20 so as to be limited to move between the stop elements 25, 25', thereby preventing removal of the rail 30 from the worktable 20.

Figure 1:
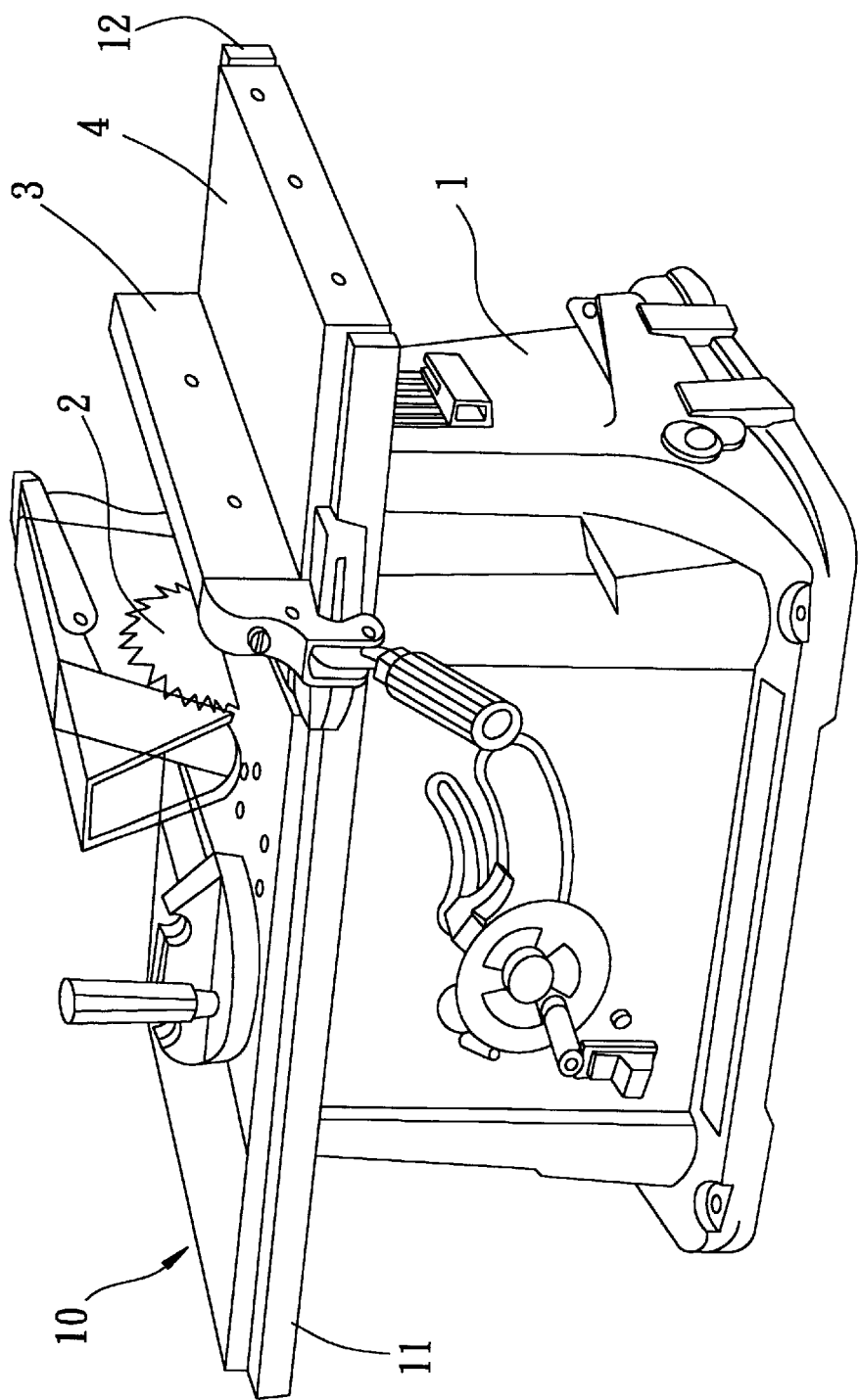
FIG. 1 is a schematic perspective view of a conventional table saw.
Figure 2:
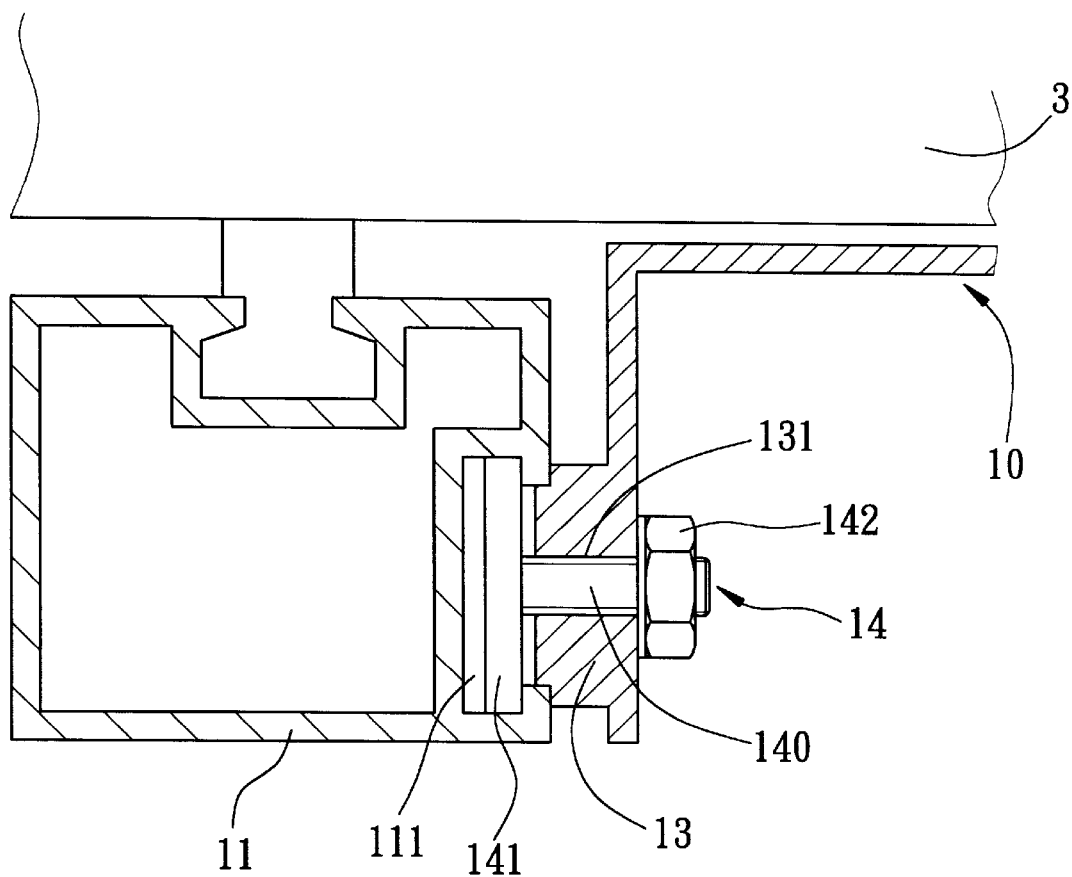
FIG. 2 illustrates how a rail is supported on a worktable of the conventional table saw.

The extension support plate 50 rides on the right end portions of the rails 30, 40. As best shown in FIG. 3, the rails 30, 40 are fixed on the extension support plate 50 by four locking units 51 (only two are shown). Because the locking units 51 are similar to the locking members 14 (see FIG. 2) in construction, a more detailed description thereof will be omitted herein for the sake of brevity.

Referring to FIG. 5, each of the rollers 24 is sleeved rotatably on a sleeve 240 that is fixed on the corresponding rotating shaft 241, and is retained on the sleeve 240 by means of a C-shaped retaining ring 244 in such a manner that the roller 24 is located between the retaining ring 244 and an outwardly extending flange 245 of the sleeve 240. Each of the rotating shafts 241 is externally threaded, and is locked on the worktable 20 by means of a washer 242 and a lock nut 243, which are sleeved on the rotating shaft 241.

Figure 6:
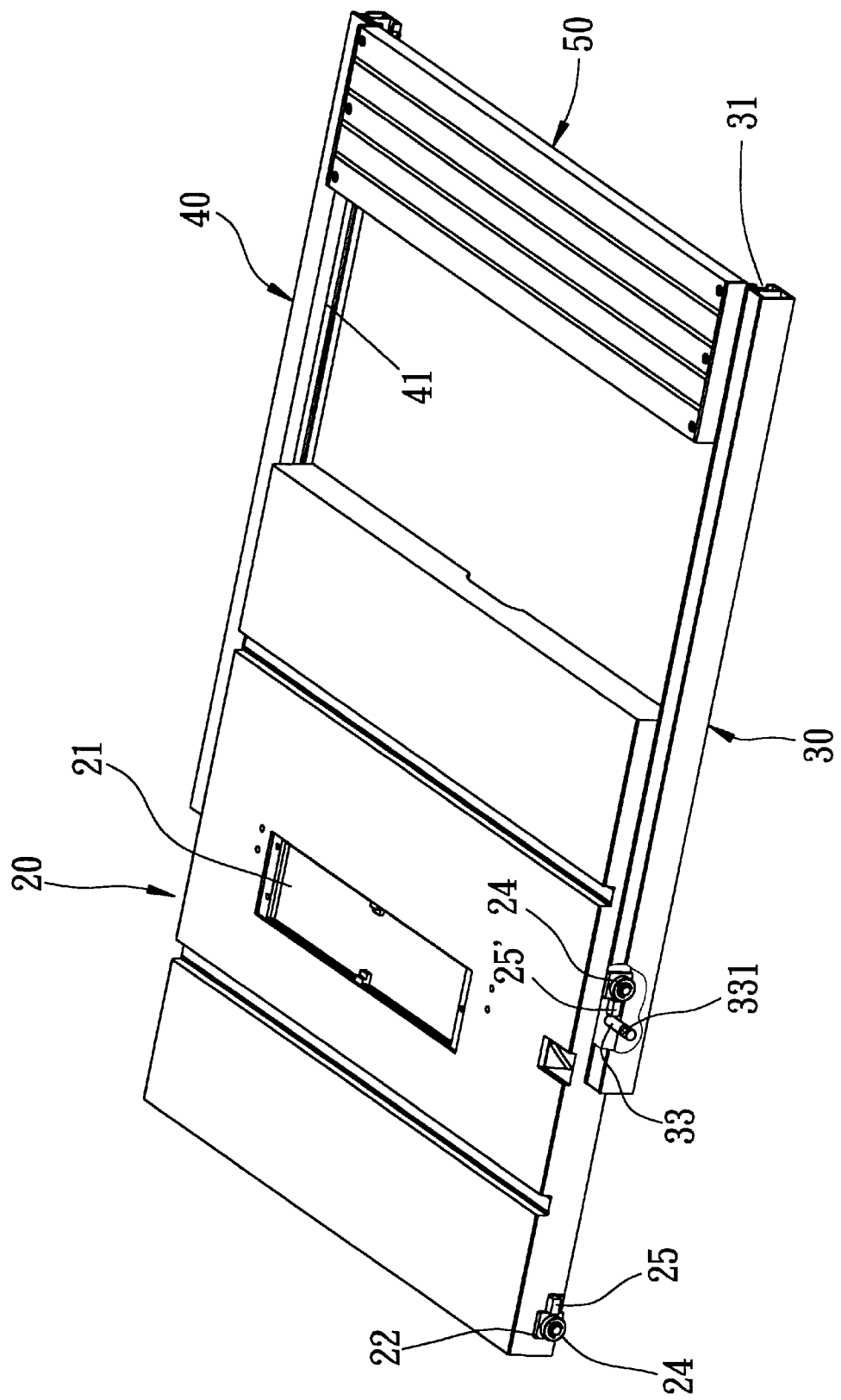
FIG. 6 is an assembled perspective view of the preferred embodiment, illustrating the movement of two rails relative to a worktable.

Accordingly, the extension support plate 50 is limited to move between a left limit position shown in FIG. 4, where the pin 33 abuts against the left stop element 25 and where the extension support plate 50 abuts against the worktable 20, and a right limit position shown in FIG. 6, where the pin 33 abuts against the right stop element 25' and where the extension support plate 50 is spaced apart from the worktable 20.

With this invention thus explained, it is apparent that numerous modifications and variations can be made without departing from the spirit and scope of this invention. It is therefore intended that this invention be limited only as indicated by the appended claims.

I claim:

1. A workpiece supporting assembly for a table saw, comprising:

a worktable having two opposite vertical side walls;

two horizontal rows of rollers, said two rows being disposed respectively and rotatably on said side walls of said worktable, each of said rollers having a horizontal rotating shaft;

two movable rails disposed respectively on said side walls of said worktable, each of said rails having an open-ended horizontal dovetail groove that extends along length thereof and that confines said rollers of a corresponding one of said rows therein; and a horizontal extension support plate riding on said rails; whereby, said rails and said extension support plate can move relative to said worktable.

2. A workpiece supporting assembly as claimed in claim 1, wherein said worktable is provided with two fixed stop elements, one of said rails being provided with a fixed element that is limited to move between said stop elements when said rails move relative to said worktable, whereby, said rails are retained on said worktable.

3. A workpiece supporting assembly as claimed in claim 2, wherein said worktable is provided with two bearings, on which said rotating shafts of an adjacent pair of said rollers are disposed respectively and rotatably, said stop elements being fixed respectively to said bearings.

4. A workpiece supporting assembly as claimed in claim 1, wherein one of said rails has a pin hole that is formed therethrough, said fixed element being constructed as a pin, which has a knurled portion that is press fitted within said pin hole.

* * * * *